Patented Sept. 13, 1938

2,130,038

UNITED STATES PATENT OFFICE 2,130,038

SULPHAMIC ACID FLUORIDES

Gerhard Schrader and Otto Bayer, Leverkusen-I. G. Werk, Germany, assignors to Winthrop Chemical Company, Inc., New York, N. Y., a corporation of New York No Drawing. Application May 25, 1936, Serial No. 81,771. In Germany May 14, 1935

8 Claims. (Cl. 260—543)

This invention relates to new and valuable sulphamic acid fluorides and to a process for preparing the same.

In accordance with the present invention sulphamic acid fluorides of the general formula

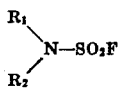

in which $R_1$ and $R_2$ stand for saturated aliphatic radicals a carbon atom of which is directly connected with the nitrogen atom which aliphatic radicals may be linked together so that they form a cycloaliphatic ring system, can be obtained by reacting upon sulphamic acid chlorides of the general formula

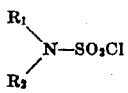

in which $R_1$ and $R_2$ have the same meaning as in the first formula with soluble metallic fluorides in the presence of a solvent or a liquid diluent.

$R_1$ and $R_2$ may stand, for instance, for the methyl, ethyl, propyl, hexyl and dodecyl radical. $R_1$ and $R_2$ may also denote alkyl radicals which are substituted, for instance, by halogen atoms or the amino, cyano, mercapto, alkoxy, carboxylic acid, carboxylic acid ester, sulfonic acid or aryl group.

$R_1$ and $R_2$ may be linked together so that they form a cycloaliphatic ring system as it is, for instance, the case in the piperidyl radical or the morpholinyl radical.

As starting sulphamic acid chlorides there come, for instance, into consideration the dimethylsulphamic acid chloride, the diethylsulphamic acid chloride, the methyl-ethyl-sulphamic acid chloride, the methyl propyl-sulphamic acid chloride, the methyl hexyl sulphamic acid chloride, the ethyl dodecyl sulphamic acid chloride, the methylmercaptoethyl-methyl sulphamic acid chloride, the phenyl ethyl-methyl sulphamic acid chloride, the β.β-dichlorodiethyl sulphamic acid chloride, the β.β-dicyanodiethyl-sulphamic acid chloride as well as the sulphamic acid chlorides of piperidine, morpholine, monomethylamino acetic acid or its methyl ester.

The said sulphamic acid chlorides may, for instance, be obtained by the action of sulphuryl chloride on the respective secondary bases.

As metallic fluorides particularly the water-soluble metallic fluorides, for instance the potassium, sodium, ammonium, zinc and silver fluorides have proved to be advantageous.

The reaction is performed in the presence of a solvent for one or both reaction components. Water has proved to be particularly advantageous. Preferably the reaction is carried out at elevated temperatures, for instance, at 70–100° C.

It is surprising that the above defined sulphamic acid fluorides can be obtained in accordance with the process of the present invention since the sulphamic acid chlorides used as starting materials are saponified by water at elevated temperatures.

The above defined sulphamic acid fluorides are stable to water even on heating. They are soluble in benzene, benzine, ether, methyl alcohol, ethyl alcohol, acetone, glycols, and acetic acid esters. The lower members in which $R_1$ and $R_2$ stand for alkyl radicals containing from 1–3 carbon atoms as, for example, the dimethyl and diethyl sulphamic acid fluorides are water-white easily mobile liquids of a characteristic chloroform-like odour. The sulphamic acid fluorides do not etch glass. Due to their stability they are suitable as intermediate products for dyestuffs. They have proved especially advantageous for the purpose of combating parasites particularly of insects. The lower members of the sulphamic acid fluorides in which $R_1$ and $R_2$ stand for alkyl radicals containing from 1–3 carbon atoms have proved to be most suitable since they may be easily vaporized or nebulized.

The sulphamic acid fluorides may be employed in the most varied manner. They may be used in the gaseous phase either alone or with the addition of other inert gases or gases being effective for combating vermin, for instance, carbon dioxide, carbon monoxide, ethylene oxide or hydrocyanic acid. Also warning or irritating substances, such as chloroformic acid ester may be added to the sulphamic acid fluorides to be gasified.

Furthermore, they may be sprayed or nebulized in the form of their solutions, for instance, in water or low boiling solvents, such as carbon tetrachloride, acetone, benzene, benzine, or also in admixture with unsaturated solvents, as are obtained for instance in the petroleum fractionation. To solutions or dispersions of the said kind likewise other media for combating vermin, for instance, nicotin may be added. The solutions of the sulphamic acid fluorides may also be absorbed by suitable substances, for instance paper or porous substances and may then be employed.

The sulphamic acid fluorides may also be used in solid or paste-like form alone or in admixture with inert substances and/or other solid or liquid media for combatting vermin. Talc or chalk may, for instance, serve as inert stretching agent. The sulphamic acid fluorides may be marketed in the form of powder or in the form of tablets.

The sulphamic acid fluorides may serve for combating the most varied kinds of vermin. They have proved to be especially suitable for combating Calandra granaria, Tenebrio molitor and others, bedbugs, cockroaches, lice, flies, gnats, all kinds of moths, fur-beetle, carpet-beetle and its larva, ants, plant-lice, Phylloxera, shield-lice and others. The sulphamic acid fluorides may also be employed for exterminating rats, mice and the like.

The following examples illustrate the invention, the parts being by weight:

Example 1

143.5 parts of dimethyl sulphamic acid chloride (B. P. under 10 mm. 72–73° C.) are refluxed for 2–3 hours at 90–100° C. with an aqueous solution of 100 parts of potassium fluoride in 120 parts of water while stirring. After the potassium chloride separated has been dissolved by the addition of water, the oily reaction product is extracted with ether. The ethereal solution is de-acidified with solid potassium carbonate and dried with the aid of sodium sulfate. After the ether is distilled off the dimethyl sulphamic acid fluoride remains as an oily liquid. By a single distillation in vacuum (B. P. under 14 mm. 42–43° C.), the crude product is obtained as an oil which is water-white easily mobile, and of a sweetish chloroform-like odour. By this method of working, 80–85 parts of pure fluoride are obtained.

Instead of potassium fluoride, with the same success, also sodium fluoride or zinc fluoride may be employed. When using solid sulphamic acid chlorides it is useful to dissolve the same in an indifferent dissolving agent, as for example xylene, and then to bring them into reaction with the aqueous solution of alkali fluoride.

Example 2

171.5 parts of diethylsulphamic acid chloride are refluxed for 3–4 hours at 90–100° C. with an aqueous solution of 100 parts of potassium fluoride in 120 parts of water while stirring well. After working up in the manner described in Example 1, a nearly colorless crude product is obtained, which is obtained pure by a single distillation (B. P. under 12 mm. 67° C.). The sulphamic acid fluoride obtained in a good yield (90–100 parts) has a very strong chloroform-like, phenolic odour.

With the same good yields the sulphamic acid chlorides of the following bases can be converted into the respective sulphamic acid fluorides:

(1) β.β-dichlorodiethylamine.
(2) Piperidine.
(3) Morpholine.
(4) β.β-dicyandiethylamine.
(5) Methylhexylamine.
(6) Methyldodecylamine.
(7) CH₃—S—CH₂—CH₂—NH—CH₃
(8) 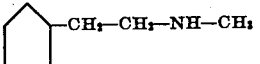
(9) 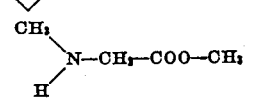

We claim:—

1. Sulphamic acid fluorides of the general formula

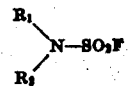

in which $R_1$ and $R_2$ stand for saturated aliphatic radicals a carbon atom of which is directly connected with the nitrogen atom, which compounds are stable to water even on heating, which are further soluble in benzene, benzine, ether, methyl alcohol, ethyl alcohol, acetone, glycols and acetic acid esters and which do not etch glass.

2. Sulphamic acid fluorides of the general formula

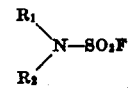

in which $R_1$ and $R_2$ stand for saturated aliphatic radicals containing from 1–3 carbon atoms a carbon atom of which is directly connected with the nitrogen atom, which compounds are stable to water even on heating, which are further soluble in benzene, benzine, ether, methyl alcohol, ethyl alcohol, acetone, glycols and acetic acid esters, and represent water-white liquids of a characteristic chloroform-like odour and which do not etch glass.

3. The process for preparing sulphamic acid fluorides which comprises reacting upon sulphamic acid chlorides of the general formula

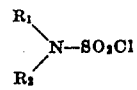

in which $R_1$ and $R_2$ stand for saturated aliphatic radicals a carbon atom of which is directly connected with the nitrogen atom with water-soluble metallic fluorides in the presence of water.

4. Sulphamic acid fluorides of the general formula

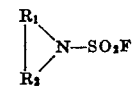

in which $R_1$ and $R_2$ stand for saturated aliphatic radicals, which compounds are stable to water even on heating, which are further soluble in benzene, benzine, ether, methyl alcohol, ethyl alcohol, acetone, glycols and acetic acid esters and which do not etch glass.

5. Sulphamic acid fluorides selected from the group consisting of piperidyl and morpholinyl sulphamic acid fluorides, which compounds are stable to water even on heating, which are further soluble in benzene, benzine, ether, methyl alcohol, ethyl alcohol, acetone, glycols and acetic acid esters and which do not etch glass.

6. The process for preparing sulphamic acid fluorides which comprises reacting upon sulphamic acid chlorides of the general formula:

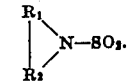

in which $R_1$ and $R_2$ stand for saturated aliphatic radicals with water-soluble metallic fluorides in the presence of water.

7. The process of preparing sulphamic acid fluorides which comprises reacting upon sulphamic acid chlorides selected from the group consisting of morpholinyl and piperidyl sulphamic acid chlorides with water-soluble metallic fluorides in the presence of water.

8. Sulphamic acid fluorides of the group consisting of compounds of the general formula

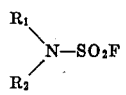

wherein $R_1$ and $R_2$ stand for saturated aliphatic radicals a carbon atom of each being directly connected with the nitrogen atom and compounds of that general formula wherein $R_1$ and $R_2$ together form a divalent saturated aliphatic chain linked by carbon atoms with the N, thereby forming a ring system, which compounds are stable to water even on heating, which are further soluble in benzene, benzine, ether, methyl alcohol, ethyl alcohol, acetone, glycols and acetic acid esters and which do not etch glass.

GERHARD SCHRADER.
OTTO BAYER.